United States Patent
Satoh et al.

(10) Patent No.: US 10,445,854 B2
(45) Date of Patent: Oct. 15, 2019

(54) IMAGE PROCESSING DEVICE, IMAGE PROCESSING METHOD, AND NON-TRANSITORY RECORDING MEDIUM

(71) Applicants: Shohichi Satoh, Kanagawa (JP); Dai Kurabayashi, Kanagawa (JP); Deyong Si, Kanagawa (JP)

(72) Inventors: Shohichi Satoh, Kanagawa (JP); Dai Kurabayashi, Kanagawa (JP); Deyong Si, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 15/586,325

(22) Filed: May 4, 2017

(65) Prior Publication Data

US 2017/0345124 A1    Nov. 30, 2017

(30) Foreign Application Priority Data

May 30, 2016  (JP) ................................ 2016-107819

(51) Int. Cl.
*G06T 1/60* (2006.01)
*G06T 1/00* (2006.01)

(52) U.S. Cl.
CPC .............. *G06T 1/60* (2013.01); *G06T 1/0007* (2013.01)

(58) Field of Classification Search
USPC ....................................................... 382/305
See application file for complete search history.

(56) References Cited

U.S. PATENT DOCUMENTS

| 8,160,360 | B2* | 4/2012 | Kim ....................... G06K 9/342 382/180 |
| 2005/0013502 | A1* | 1/2005 | Lim ................... G06K 9/00456 382/254 |
| 2010/0150444 | A1* | 6/2010 | Kim .......................... G06T 7/11 382/180 |
| 2011/0241933 | A1* | 10/2011 | Nishiyama .............. G01S 7/064 342/179 |
| 2016/0093056 | A1* | 3/2016 | Ouzounis ................ G06T 9/008 382/224 |

FOREIGN PATENT DOCUMENTS

| JP | 5-342350 | 12/1993 |
| JP | 2006-048222 | 2/2006 |

* cited by examiner

*Primary Examiner* — Jerome Grant, II
(74) *Attorney, Agent, or Firm* — Oblon, McClelland, Maier & Neustadt, L.L.P.

(57) ABSTRACT

An image processing device includes a label memory to store a first label assigned to a pixel in a previous line of a processing target image subjected to an assignment process prior to the assignment process on a processing target line of the processing target image, a label area memory to store identification information identifying a label area including pixels assigned with an identical label, and circuitry to, if at least one target pixel in the processing target line is an effective pixel, perform the assignment process on the target pixel based on at least one label that includes the first label and is assigned to at least one peripheral pixel peripheral to the target pixel, and to perform an updating process of updating the identification information based on a position of the target pixel and the label assigned to the target pixel.

12 Claims, 10 Drawing Sheets

FIG. 4

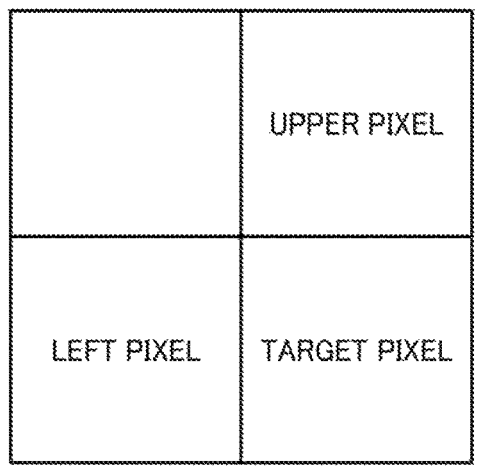

FIG. 5

| ADDRESS 0 | ADDRESS 1 | ADDRESS 2 | ... | ADDRESS 14 | ADDRESS 15 |
|---|---|---|---|---|---|
| LABEL NUMBER | LABEL NUMBER | LABEL NUMBER | ... | LABEL NUMBER | LABEL NUMBER |
| MINIMUM X COORDINATE | MINIMUM X COORDINATE | MINIMUM X COORDINATE | ... | MINIMUM X COORDINATE | MINIMUM X COORDINATE |
| MAXIMUM X COORDINATE | MAXIMUM X COORDINATE | MAXIMUM X COORDINATE | ... | MAXIMUM X COORDINATE | MAXIMUM X COORDINATE |
| MINIMUM Y COORDINATE | MINIMUM Y COORDINATE | MINIMUM Y COORDINATE | ... | MINIMUM Y COORDINATE | MINIMUM Y COORDINATE |
| MAXIMUM Y COORDINATE | MAXIMUM Y COORDINATE | MAXIMUM Y COORDINATE | ... | MAXIMUM Y COORDINATE | MAXIMUM Y COORDINATE |

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LABEL NUMBER | 0 | 1 | 2 | 3 | 4 | 5 | 6 | 7 | 8 | 9 | 10 | 11 | 12 | 13 | 14 | 15 |

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LABEL NUMBER | 0 | 1 | 2 | 3 | 4 | 2 | 6 | 7 | 8 | 9 | 10 | 11 | 12 | 13 | 14 | 15 |

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LABEL NUMBER | 0 | 1 | 2 | 3 | 4 | 2 | 6 | 2 | 8 | 9 | 10 | 11 | 12 | 13 | 14 | 15 |

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LABEL NUMBER | 0 | 1 | 1 | 3 | 4 | 1 | 6 | 1 | 8 | 9 | 10 | 11 | 12 | 13 | 14 | 15 |

FIG. 9

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 1 | 1 | 1 | 1 | 1 | 1 | 0 | 0 | 0 | 0 | 0 | 0 | 0 | 0 | 0 | 0 |

FIG. 11

| | | PATTERN 1 | PATTERN 2 | | PATTERN 3 | PATTERN 4 | PATTERN 5 |
|---|---|---|---|---|---|---|---|
| CONDITION | ULM | LABEL 1 | LABEL 1 | | LABEL 1 | 0 | 0 |
| | LEFT | LABEL 1 | LABEL 2 | | 0 | LABEL 1 | 0 |
| LABEL TO BE UPDATED | | LABEL 1 | LABEL 1 | LABEL 2 | LABEL 1 | LABEL 1 | AVAILABLE LABEL 1 |
| CONTENTS TO BE REWRITTEN IN LABEL AREA MEMORY | LABEL NUMBER | NOT TO BE UPDATED | NOT TO BE UPDATED | 1 | NOT TO BE UPDATED | NOT TO BE UPDATED | 1 |
| | MINIMUM X COORDINATE | NOT TO BE UPDATED | MINIMUM VALUE | NOT TO BE UPDATED | NOT TO BE UPDATED | NOT TO BE UPDATED | CURRENT X COORDINATE |
| | MAXIMUM X COORDINATE | NOT TO BE UPDATED | MAXIMUM VALUE | NOT TO BE UPDATED | NOT TO BE UPDATED | CURRENT X COORDINATE | CURRENT X COORDINATE |
| | MINIMUM Y COORDINATE | NOT TO BE UPDATED | MINIMUM VALUE | NOT TO BE UPDATED | NOT TO BE UPDATED | NOT TO BE UPDATED | CURRENT Y COORDINATE |
| | MAXIMUM Y COORDINATE | NOT TO BE UPDATED | MAXIMUM VALUE | NOT TO BE UPDATED | CURRENT Y COORDINATE | NOT TO BE UPDATED | CURRENT Y COORDINATE |

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LABEL NUMBER | 0 | 1 | 2 | 3 | 4 | 5 | 6 | 7 | 8 | 9 | 10 | 11 | 12 | 13 | 14 | 15 |

IMAGE PROCESSING DEVICE, IMAGE PROCESSING METHOD, AND NON-TRANSITORY RECORDING MEDIUM

CROSS-REFERENCE TO RELATED APPLICATION

This patent application is based on and claims priority pursuant to 35 U.S.C.§ 119(a) to Japanese Patent Application No. 2016-107819 filed on May 30, 2016, in the Japan Patent Office, the entire disclosure of which is hereby incorporated by reference herein.

BACKGROUND

Technical Field

The present invention relates to an image processing device, an image processing method, and a non-transitory recording medium.

Description of the Related Art

According to an image processing technique, the distance and position of an object are measured based on an image acquired by an image sensor. The measurement of the distance and position of the object based on the image may be preceded by image processing such as, for example, a labeling process of assigning labels to areas included in the image to identify the areas in the image. To perform the labeling process without limiting the number of provisional labels, an image processing apparatus may use a content addressable memory (CAM).

SUMMARY

In one embodiment of this invention, there is provided an improved image processing device that includes, for example, a label memory, a label area memory, and circuitry. The label memory stores a first label assigned to a previous-stage pixel included in a previous line subjected to an assignment process of assigning a label to a pixel prior to the assignment process on a processing target line. The previous line and the processing target line are both included in a processing target image to be subjected to the assignment process. The label area memory stores identification information that identifies a label area including pixels assigned with an identical label. If at least one target pixel in the processing target line is an effective pixel, the circuitry performs the assignment process on the at least one target pixel to assign a label to the at least one target pixel based on at least one label that includes the first label and is assigned to at least one peripheral pixel peripheral to the at least one target pixel. The circuitry further performs an updating process of updating the identification information based on a position of the at least one target pixel and the label assigned to the at least one target pixel.

In one embodiment of this invention, there is provided an improved image processing method including, for example: storing, in a label memory, a first label assigned to a previous-stage pixel included in a previous line subjected to an assignment process of assigning a label to a pixel prior to the assignment process on a processing target line, the previous line and the processing target line both included in a processing target image to be subjected to the assignment process; storing, in a label area memory, identification information that identifies a label area including pixels assigned with an identical label; performing, based on a determination that at least one target pixel in the processing target line is an effective pixel, the assignment process on the at least one target pixel to assign a label to the at least one target pixel based on at least one label that includes the first label and is assigned to at least one peripheral pixel peripheral to the at least one target pixel; and updating the identification information based on a position of the at least one target pixel and the label assigned to the at least one target pixel.

In one embodiment of this invention, there is provided a non-transitory recording medium storing a program for causing a computer to execute the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of peripheral pixels according to the embodiment;

FIG. 5 is a diagram illustrating an example of identification information identifying label areas according to the embodiment;

FIG. 9 is a diagram illustrating an example of a currently-used label table memory of the image processing system according to the embodiment in FIG. 1;

FIG. 11 is a diagram illustrating an example of an updating process according to the embodiment;

Figure 1:
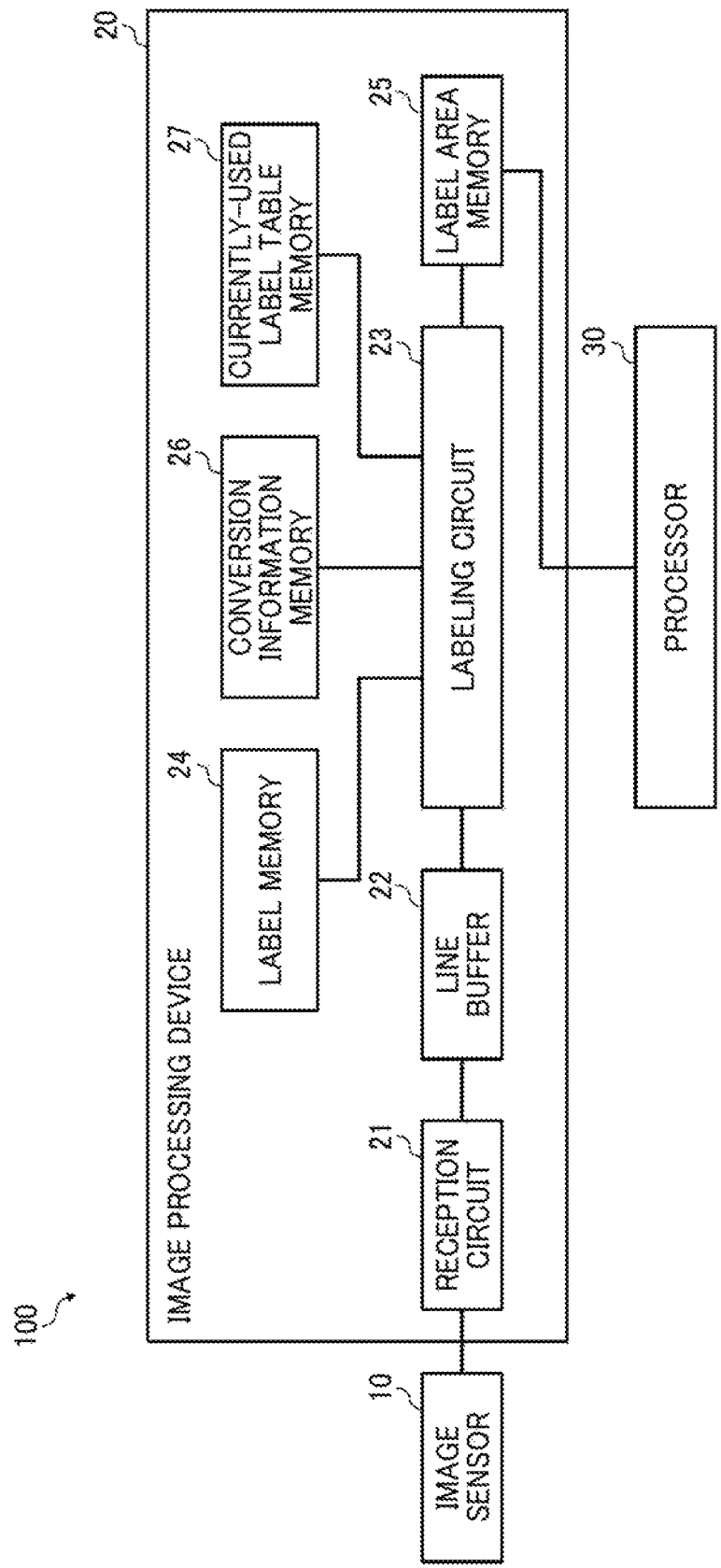
FIG. 1 is a diagram illustrating a hardware configuration example of an image processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Image processing of measuring the distance and position of an object based on an image acquired by an image sensor may be preceded by a labeling process of assigning labels to areas in the image. If the image is output from the image sensor at a high output frame rate, however, it is difficult to perform the labeling process with the same period as that of the output frame rate.

Referring now to the accompanying drawings, wherein like reference numerals designate identical or corresponding parts throughout the several views, an image processing device and an image processing method according to an embodiment of the present invention will be described in detail.

A hardware configuration example of an image processing system according to an embodiment of the present invention will first be described.

FIG. 1 is a diagram illustrating a hardware configuration example of an image processing system 100 according to an embodiment of the present invention. The image processing system 100 according to the embodiment includes an image sensor 10, an image processing device 20, and a processor 30. The image processing device 20 includes a reception circuit 21, a line buffer 22, a labeling circuit 23, a label memory 24, a label area memory 25, a conversion information memory 26, and a currently-used label table memory 27.

The image sensor 10 acquires an image, and inputs an image signal representing the image to the reception circuit 21 of the image processing device 20.

The reception circuit 21 receives the image signal from the image sensor 10, and inputs to the line buffer 22 pixel values of pixels in one horizontal line of the image as a processing target line to be subjected to a label assignment process.

The line buffer 22 stores the pixel values of the pixels in the processing target line. The labeling circuit 23 reads the pixels one by one from the line buffer 22, and performs a labeling process on each of the pixels. The labeling circuit 23 may read a plurality of pixels at one time from the line buffer 22. The labeling process includes an assignment process and an updating process.

In the assignment process, the labeling circuit 23 assigns labels for respective processing target lines, to thereby assign labels to areas included in an image. A label is identification information that identifies an area in an image. In the following description of the embodiment, the label corresponds to the label number, and a label of label number n will be referred to as label n. Further, an area including pixels assigned with the same label will be referred to as a label area.

In the updating process, the labeling circuit 23 updates a variety of memories referred to in the assignment process, i.e., the label memory 24, the label area memory 25, the conversion information memory 26, and the currently-used label table memory 27. Each of the label memory 24, the label area memory 25, the conversion information memory 26, and the currently-used label table memory 27 is a random access memory (RAM). The label memory 24, the label area memory 25, the conversion information memory 26, and the currently-used label table memory 27 may be implemented as a physically single memory or as physically plural memories.

Figure 2:
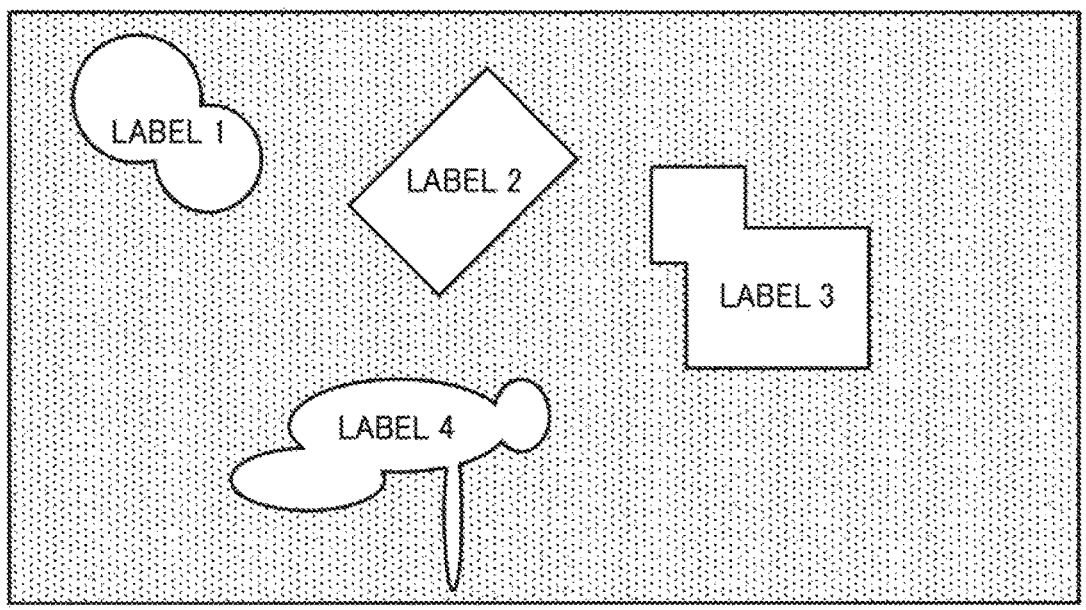
FIG. 2 is a diagram illustrating an example of an image including label areas according to the embodiment.

FIG. 2 is a diagram illustrating an example of an image including label areas according to the embodiment. FIG. 2 illustrates an example of an image including a label area assigned with a label of label number 1, a label area assigned with a label of label number 2, a label area assigned with a label of label number 3, and a label area assigned with a label of label number 4.

A functional configuration of the image processing device 20 according to the embodiment will now be described.

Figure 3:
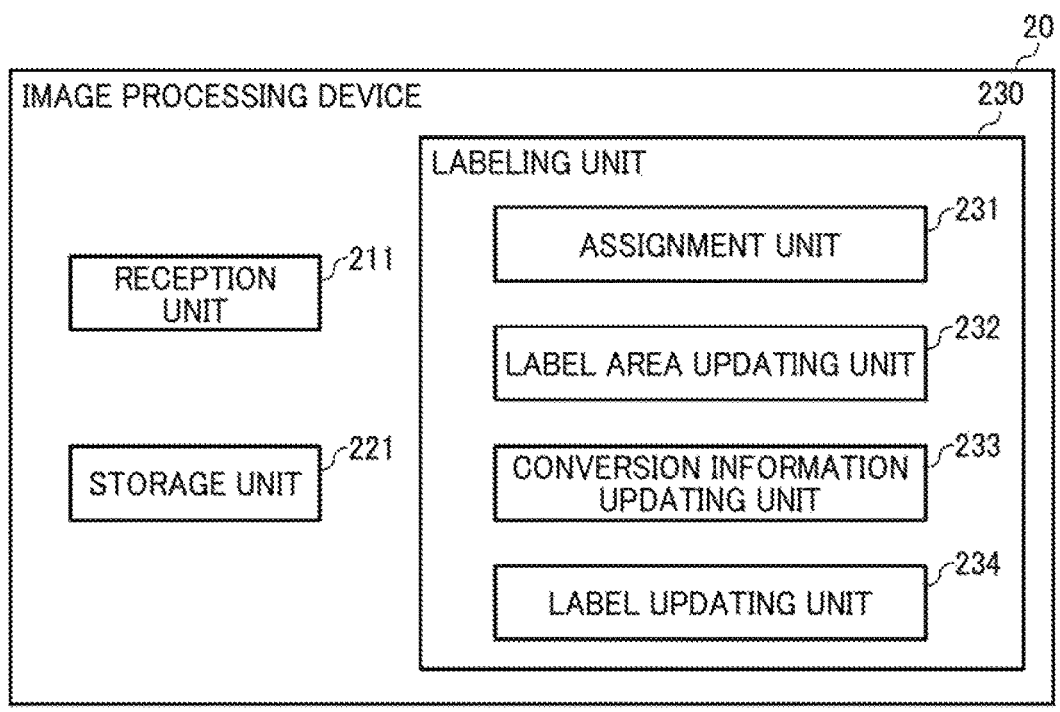
FIG. 3 is a diagram illustrating a functional configuration example of an image processing device of the image processing system according to the embodiment in FIG. 1.

FIG. 3 is a diagram illustrating a functional configuration example of the image processing device 20 according to the embodiment. The image processing device 20 according to the embodiment includes a reception unit 211, a storage unit 221, and a labeling unit 230. The reception unit 211 is implemented by the reception circuit 21, for example. The storage unit 221 is implemented by the line buffer 22 (i.e., a processing target line storage unit), the label memory 24 (i.e., a label storage unit), the label area memory 25, the conversion information memory 26, and the currently-used label table memory 27, for example. The labeling unit 230 includes an assignment unit 231, a label area updating unit 232, a conversion information updating unit 233, and a label updating unit 234. The labeling unit 230 is implemented by the labeling circuit 23, for example.

The assignment unit 231 scans the pixels in each of the processing target lines acquired one by one from the line at the upper end of the image. The assignment unit 231 scans the pixels one by one in a left-to-right direction to perform the assignment process of assigning a label to a target pixel. Specifically, the assignment unit 231 determines whether or not the target pixel is an effective pixel. For example, if the pixel value of the target pixel equals or exceeds a threshold, the assignment unit 231 determines that the target pixel is an effective pixel. If the target pixel is an effective pixel, the assignment unit 231 then performs the assignment process of assigning a label to the target pixel based on at least one label number assigned to at least one peripheral pixel peripheral to the target pixel.

The assignment unit 231 may determine whether or not the target pixel is an effective pixel based on the brightness value of the target pixel.

FIG. 4 is a diagram illustrating an example of peripheral pixels according to the embodiment. In the example of FIG. 4, the label assignment process is performed based on the label number of a peripheral pixel above the target pixel (hereinafter referred to as the upper pixel) and the label number of a peripheral pixel to the left of the target pixel (hereinafter referred to as the left pixel). Details of the label assignment process will be described later with reference to FIG. 11.

The following description of the embodiment will be given of a 4-neighbor labeling algorithm. The labeling algorithm, however, is not limited to the 4-neighbor labeling algorithm, and may be an 8-neighbor labeling algorithm, for example. Further, the following description of the embodiment will be given of an example of a single target pixel. The labeling unit 230, however, may read a plurality of pixels from the line buffer 22 to perform the labeling process on each group of a plurality of target pixels, i.e., an area including a plurality of target pixels.

In the example of FIG. 4, the upper pixel above the target pixel in the processing target line is included in a line subjected to the assignment process prior to the assignment process on the processing target line. To assign a label to the target pixel in the processing target line, therefore, the assignment unit 231 uses the label number assigned to a previous-stage pixel included in the line subjected to the assignment process prior to the assignment process on the processing target line. In the present embodiment, the previous-stage pixel is the upper pixel.

Referring back to FIG. 1, the label memory 24 stores, as a first label, the label number assigned to the previous-stage pixel included in the line subjected to the assignment process prior to the assignment process on the processing target line. In the present embodiment, the depth of the label memory 24 is equal to the width of the image to be processed. For example, if the image to be processed has a width of 512 dots, the depth of the label memory 24 is 512.

The label area memory 25 stores identification information that identifies a label area including pixels assigned with the same label.

FIG. 5 is a diagram illustrating an example of the identification information identifying label areas according to the embodiment. The identification information according to the embodiment includes the label number and coordinate information including the minimum x coordinate, the maximum x coordinate, the minimum y coordinate, and the maximum y coordinate. In the example of FIG. 5, each label area is identified as a rectangle circumscribed about the label area with the minimum x coordinate, the maximum x coordinate, the minimum y coordinate, and the maximum y coordinate. In the present embodiment, the origin of the x-y coordinates corresponds to the upper-left corner of the image in FIG. 4.

For simplicity, FIG. 5 illustrates an example in which the label area is identified as a rectangle circumscribed about the label area. The identification information, however, may have a data format that identifies the position and size of the label area in more detail. Further, the identification information is not limited to the information representing the position and size of the label area, and may include, for example, a feature value representing a feature of each of the pixels included in the label area. The feature value is, for example, brightness information representing the brightness of the pixel. If the brightness information is used to identify the label area, the label area may be identified as a set of pixels each having brightness satisfying a predetermined condition, for example.

Referring back to FIG. 3, the label area updating unit 232 updates the identification information of the label area based on the position of the target pixel and the label assigned to the target pixel.

In the labeling process, areas identified with two different labels may be integrated into one integrated label area. In this case, the two different labels are also integrated into the same label. In the present embodiment, the label number of the label assigned to the integrated label area is the label number of the label assigned to the upper pixel above the target pixel. The method of determining the label number of the label assigned to the integrated label area may be selected as desired. The label number of the label assigned to the integrated label area may be the smaller one of the label numbers of the two different labels, for example.

A description will now be given of an example in which areas identified with two different labels are integrated into one integrated label area.

Figure 6A:
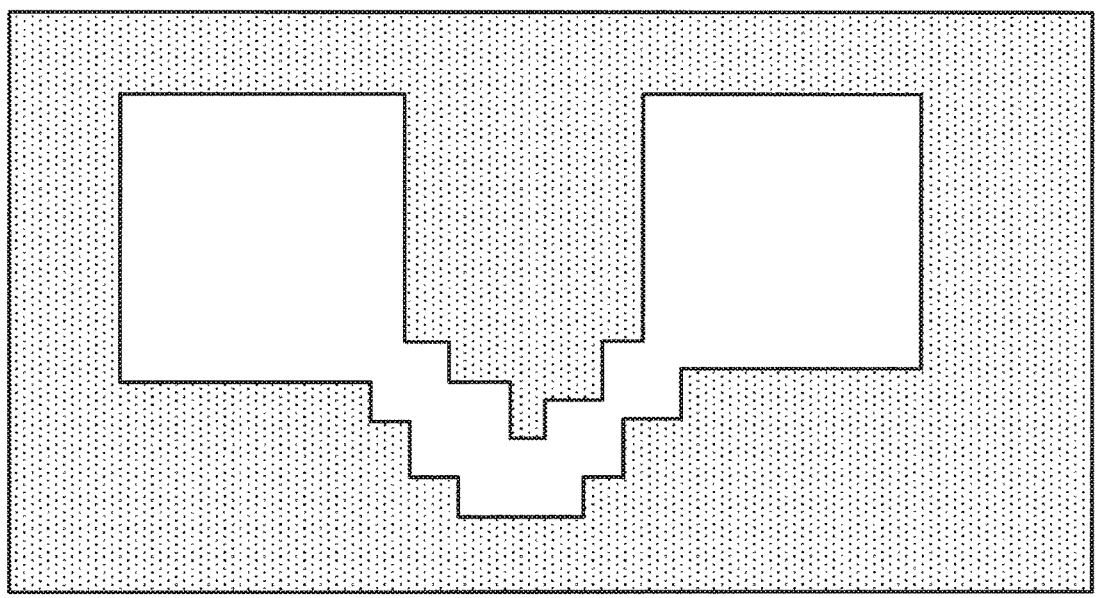
FIG. 6A is a diagram illustrating an example of an image to be subjected to a labeling process according to the embodiment.
Figure 6B:
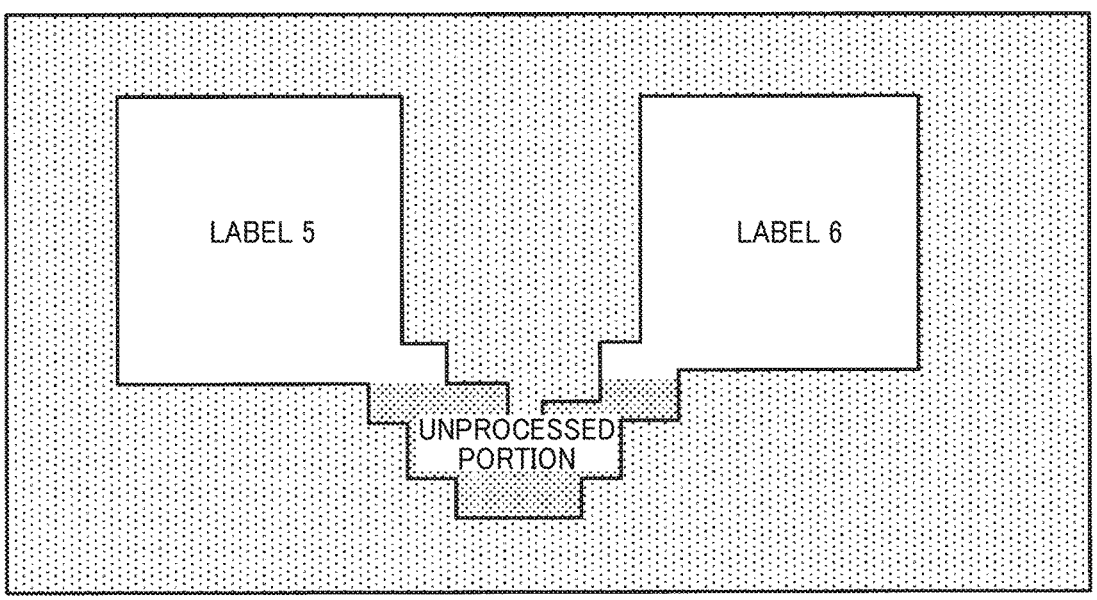
FIG. 6B is a diagram illustrating an example of one stage of the labeling process performed on the image in FIG. 6A.

FIG. 6A is a diagram illustrating an example of an image to be subjected to the labeling process according to the embodiment, in which the image includes one area to be assigned with a label. FIG. 6B is a diagram illustrating an example of one stage of the labeling process performed on the image in FIG. 6A. FIG. 6B illustrates an example in which the area included in the image of FIG. 6A is identified as including a label area assigned with a label of label number 5 and a label area assigned with a label of label number 6.

If the label areas identified with the two different labels are integrated into one integrated label area, the labeling process on the processing target line fails unless the label numbers stored in the label memory 24 are rewritten to reflect the label number assigned to the integrated label area.

Figures 7, 8A, 8B, 8C, 8D:
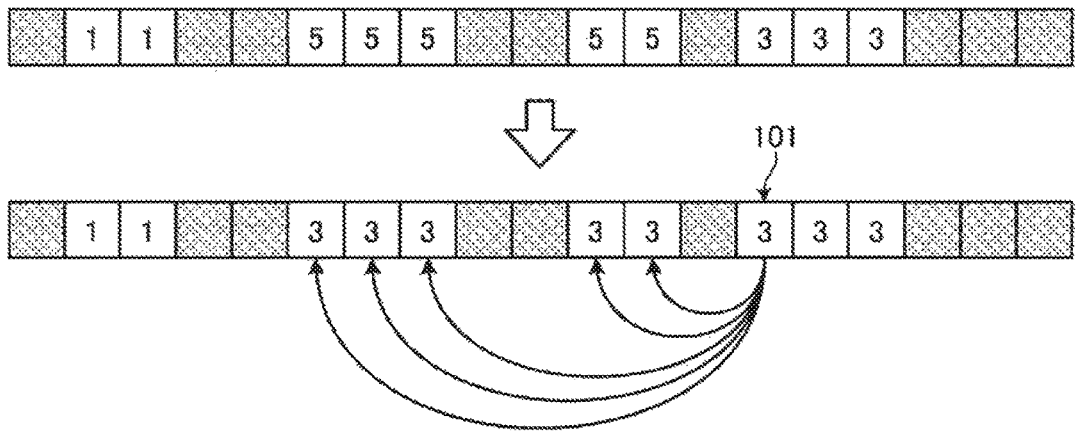
FIG. 7 is a diagram illustrating an issue involved in rewriting of a label memory.
FIGS. 8A to 8D are diagrams illustrating an example of updating a conversion information memory of the image processing system according to the embodiment in FIG. 1.

FIG. 7 is a diagram illustrating an issue involved in rewriting of the label memory 24. FIG. 7 illustrates an example of rewriting of the label memory 24 for a case in which a label area of label number 5 and a label area of label number 3 are integrated into a label area of label number 3. In this case, the addresses storing label number 5 are referred back to from a currently-referred address 101 in the label memory 24, and label number 5 stored at these addresses is rewritten into label number 3.

If the rewriting of the label memory 24 takes place at every integration of label areas, as in the example of FIG. 7, however, it is difficult to perform in real time the labeling process on the areas included in the image output from the image sensor 10.

The image processing device 20 according to the embodiment therefore employs the conversion information memory 26 to prevent the label memory 24 from being updated at every integration of label areas.

The conversion information memory 26 in FIG. 1 is a storage element that stores conversion information for converting the label number stored in the label memory 24. In the conversion information, the first label assigned to the previous-stage pixel included in the pre-integration label area is associated with a second label that is newly assigned to the integrated label area. The data format of the conversion information may be selected as desired. In the present embodiment, a lookup table is employed as the data format of the conversion information. The conversion information memory 26 includes storage areas, the number of which is the same as the number of assignable labels, and the respective addresses of which store label numbers.

If label areas different in the label assigned to the previous-stage pixel included in each of the label areas are integrated into an integrated label area by the updating process by the label area updating unit 232, the conversion information updating unit 233 in FIG. 3 updates the conversion information memory 26 to convert the first label into the second label, i.e., convert the label number assigned to the previous-stage pixel included in each of the pre-integration label areas into the label number that is newly assigned to the integrated label area.

The label numbers stored at the respective addresses in the conversion information memory 26 are updated in parallel at the same time, and are read in parallel at the same time. Therefore, the time taken for the label number updating operation is the same whether the conversion information updating unit 233 accesses a plurality of addresses or accesses a single address. Similarly, the time taken for the label number reading operation is the same whether the assignment unit 231 accesses a plurality of addresses or accesses a single address.

FIGS. 8A to 8D are diagrams illustrating an example of updating the conversion information memory 26 according to the embodiment. In the example of FIGS. 8A to 8D, each of addresses in the upper row represents the first label, i.e., the pre-conversion label number, and each of label numbers in the lower row (i.e., a value stored at the corresponding address in the upper row) represents the second label, i.e., the post-conversion label number.

In the initial state of the conversion information memory 26, each of the addresses matches the value stored at the address, as illustrated in FIG. 8A. That is, the first label, i.e., the pre-conversion label number, matches the second label, i.e., the post-conversion label number.

For example, if a label area of label number 5 is integrated into a label area of label number 2, the conversion information updating unit 233 updates label number 5 stored at address 5 in the conversion information memory 26 to label number 2, as illustrated in FIG. 8B.

Further, if a label area of label number 7 is integrated into the label area of label number 2, the conversion information updating unit 233 updates label number 7 stored at address 7 in the conversion information memory 26 to label number 2, as illustrated in FIG. 8C.

Further, if the label area of label number 2 is integrated into a label area of label number 1, the conversion information updating unit 233 updates label number 2 stored at addresses 2, 5, and 7 in the conversion information memory 26 to label number 1, as illustrated in FIG. 8D.

In the example of the conversion information memory 26 in FIGS. 8A to 8D, label number 0 stored at address 0 is regarded as representing an invalid label that is not used in the labeling process. In the example of the conversion information memory 26 in FIGS. 8A to 8D, therefore, it is possible to assign labels to up to 15 areas included in the image to be subjected to the labeling process.

The currently-used label table memory 27 in FIG. 1 stores information as to whether or not each of the label numbers is used.

FIG. 9 is a diagram illustrating an example of the currently-used label table memory 27 according to the embodiment. In the example of the currently-used label table memory 27 in FIG. 9, each of addresses represents a label number, and corresponds to a storage element having 1-bit information. If a given label number is used, 1 is set to the address representing the label number. If a given label number is not used, 0 is set to the address representing the label number. Since label number 0 is regarded as representing the invalid label, 1 is constantly set to address 0 representing label number 0.

The values stored at the respective addresses in the currently-used label table memory 27 are updated and read in parallel at the same time by the assignment unit 231. This configuration allows simplification of hardware, resulting in a reduction in cost of the image processing device 20 and an increase in speed of the labeling process.

When assigning a new label number to a given area, the assignment unit 231 in FIG. 3 reads in parallel the values stored at the respective addresses in the currently-used label table memory 27. The assignment unit 231 then sets 1 as the value of the minimum one of addresses storing the value 0, and assigns the area with the label number represented by the minimum address.

The label updating unit 234 updates the label memory 24. Specifically, if the target pixel as the x-th pixel in the processing target line is not an effective pixel, the label updating unit 234 writes label number 0, which represents the invalid label, at address x in the label memory 24. Further, after the completion of the label assignment process on pixels in the processing target line (i.e., in one line), the label updating unit 234 inputs the first label, i.e., the label number read from each of the corresponding addresses in the label memory 24, to the conversion information memory 26 as the read address of the conversion information memory 26. The label updating unit 234 then acquires the second label from the conversion information memory 26 and writes the second label back to the address in the label memory 24, to thereby update the label memory 24.

An image processing method according to the embodiment will now be described.

Figure 10A:
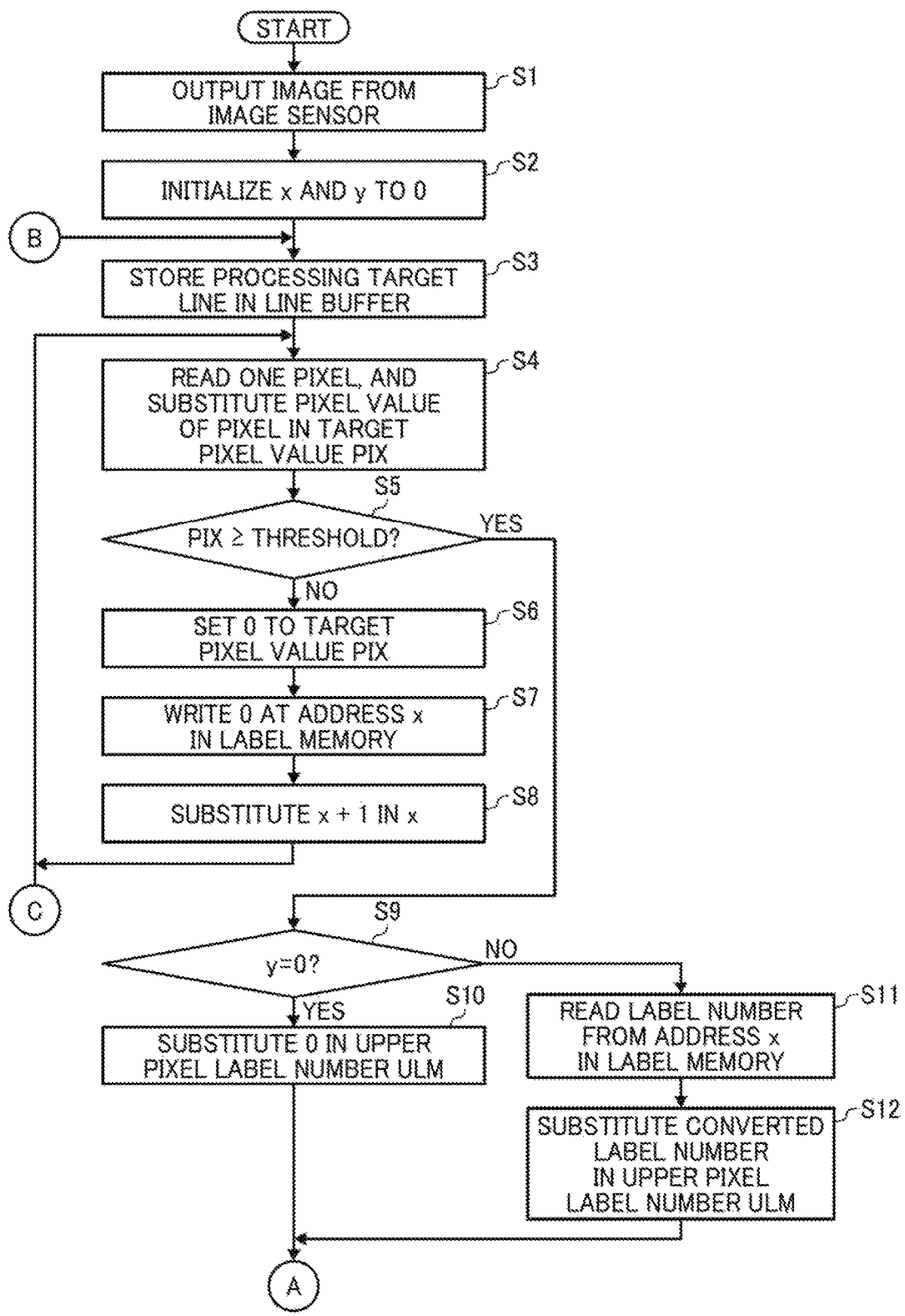
FIGS. 10A and 10B are flowcharts illustrating an example of an image processing method according to the embodiment.
Figure 10B:
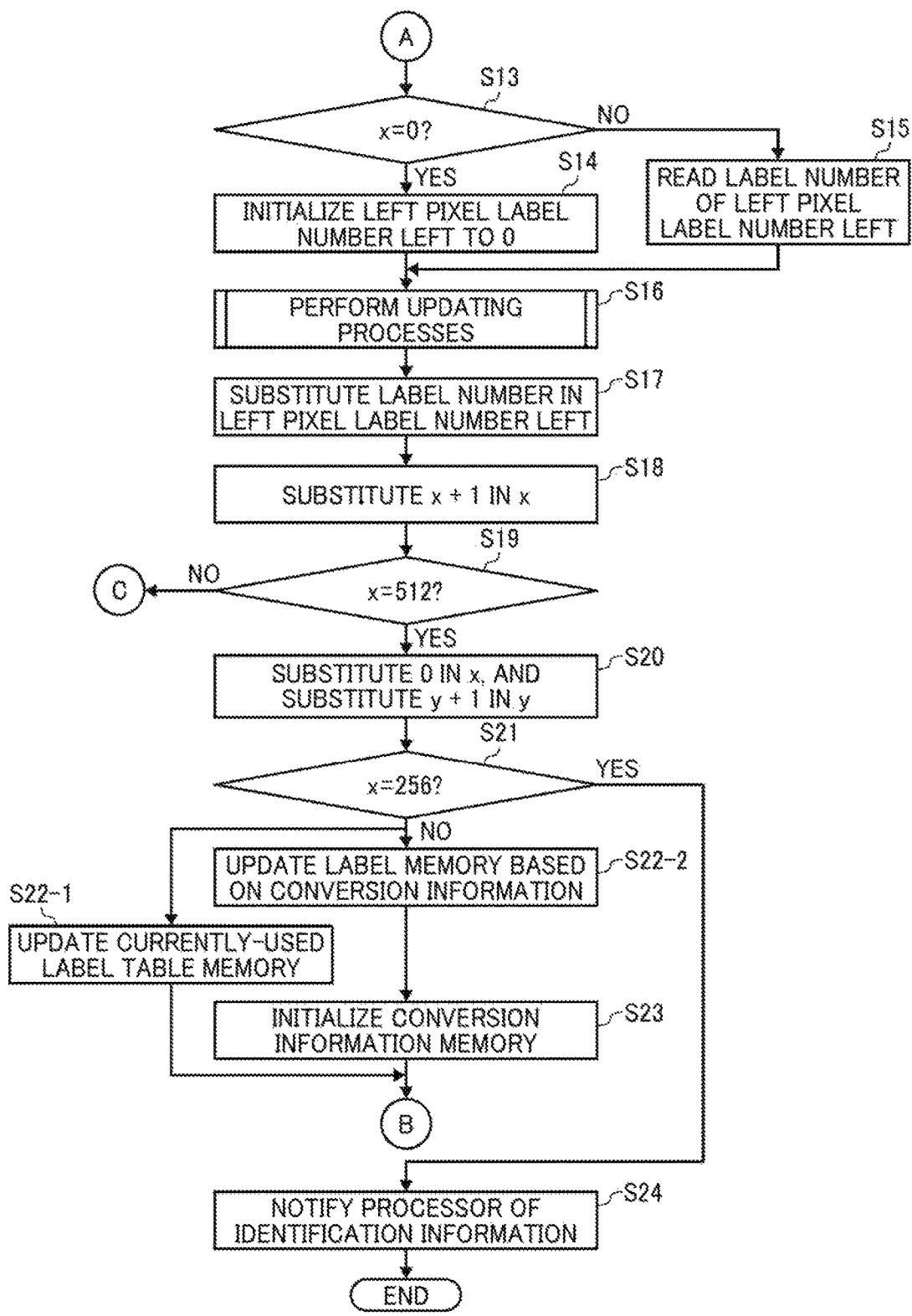

FIGS. 10A and 10B are flowcharts illustrating an example of the image processing method according to the embodiment. FIGS. 10A and 10B illustrate an example in which the image sensor 10 outputs an image of 512 dots in the horizontal direction×256 lines in the vertical direction.

At step S1, the image sensor 10 first outputs the image.

At step S2, the assignment unit 231 initializes each of address x and address y to 0. Herein, address x is the read address in the horizontal direction, and address y is the read address in the vertical direction.

At step S3, the reception unit 211 acquires the y-th line from the image as the processing target line, and stores the processing target line into the line buffer 22.

At step S4, the assignment unit 231 reads the x-th pixel from the processing target line stored in the line buffer 22 as the target pixel, and substitutes the pixel value of the target pixel in a target pixel value PIX.

At step S5, the assignment unit 231 determines whether or not the target pixel value PIX equals or exceeds a threshold, to thereby determine whether or not the target pixel is an effective pixel.

If it is determined at step S5 that the target pixel is not an effective pixel (NO at step S5), the assignment unit 231 proceeds to step S6 to set 0 to the target pixel value PIX. At step S7, the label updating unit 234 writes label number 0, which represents the invalid label, at address x in the label memory 24.

At step S8, the assignment unit 231 substitutes x+1 in address x, and returns to the process of step S4. To equalize the number of processing clocks between the case in which the target pixel value PIX is 0 and the case in which the target pixel value PIX is not 0, the assignment unit 231 may return to the process of step S4 after the lapse of a predetermined number of clocks.

If it is determined at step S5 that the target pixel is an effective pixel (YES at step S5), the assignment unit 231 proceeds to step S9 to determine whether or not address y is 0.

If it is determined at step S9 that address y is 0 (YES at step S9), the assignment unit 231 proceeds to step S10 to substitute 0 in an upper pixel label number ULM, which represents the label number of the upper pixel. Then, the procedure proceeds to step S13.

If it is determined at step S9 that address y is not 0 (NO at step S9), the assignment unit 231 proceeds to step S11 to read the first label, i.e., the label number at address x in the label memory 24. At step S12, the assignment unit 231 then inputs the label number read in the process of step S11 to the conversion information memory 26 as the read address of the conversion information memory 26, and acquires and substitutes the second label, i.e., the label number in the conversion information memory 26, in the upper pixel label number ULM. At step S13, the assignment unit 231 determines whether or not address x is 0. If it is determined at step S13 that address x is 0 (YES at step S13), the assignment unit 231 proceeds to step S14 to initialize a left pixel label number LEFT, which represents the label number of the left pixel, to 0. If the assignment unit 231 is implemented by hardware such as an integrated circuit (IC), the process of step S14 allows simplification of the hardware, resulting in a reduction in cost of the image processing device 20.

If it is determined at step S13 that address x is not 0 (NO at step S13), the assignment unit 231 proceeds to step S15 to read the label number substituted in the left pixel label number LEFT.

At step S16, the updating process by the label area updating unit 232 of updating the label area memory 25, the updating process by the conversion information updating unit 233 of updating the conversion information memory 26, and the updating process by the label updating unit 234 of updating the label memory 24 take place.

Patterns of the updating processes performed at step S16 will now be described in detail.

FIG. 11 is a diagram illustrating an example of the updating processes according to the embodiment. FIG. 11 includes an example in which the upper pixel is assigned with a label of label number 1, and an example in which the left pixel is assigned with a label of label number 2, i.e., a label different from the label of the upper pixel.

In a first pattern, the upper pixel is assigned with label 1, and the left pixel is also assigned with label 1. In this case, the assignment unit 231 determines that the target pixel is included in a label area of label 1.

In the first pattern, the label area updating unit 232 does not update the label area memory 25, and the conversion information updating unit 233 does not update the conversion information memory 26. Further, the label updating unit 234 does not update the label memory 24.

In a second pattern, the upper pixel is assigned with label 1, and the left pixel is assigned with label 2. In this case, the assignment unit 231 determines that the target pixel is included in a label area of label 1.

In the second pattern, the label area updating unit 232 integrates a label area of label 2 into the label area of label 1. Specifically, the label area updating unit 232 updates the minimum x coordinate of the label area of label 1 to the smaller one of the minimum x coordinate of label 1 and the minimum x coordinate of label 2. The label area updating unit 232 further updates the maximum x coordinate of the label area of label 1 to the larger one of the maximum x coordinate of label 1 and the maximum x coordinate of label 2. Further, the label area updating unit 232 updates the minimum y coordinate of the label area of label 1 to the smaller one of the minimum y coordinate of label 1 and the minimum y coordinate of label 2. The label area updating unit 232 further updates the maximum y coordinate of the label area of label 1 to the larger one of the maximum y coordinate of label 1 and the maximum y coordinate of label 2.

Further, the label area updating unit 232 updates label number 2 of the label area stored at address 2 to label number 1. This updating causes mismatch between address 2 and label number 1 stored at address 2. In this case, the process of later-described step S22-1 is performed such that the number of the address not matching the label number stored thereat is reused as an unused label number.

Further, in the second pattern, the conversion information updating unit 233 updates the conversion information memory 26 to convert label number 2 into label number 1, and the label updating unit 234 does not update the label memory 24.

In a third pattern, the upper pixel is assigned with label 1, and the left pixel is not an effective pixel, i.e., the left pixel label number LEFT is 0. In this case, the assignment unit 231 determines that the target pixel is included in a label area of label 1.

In the third pattern, the label area updating unit 232 updates the label area of label 1. Specifically, the label area updating unit 232 updates the maximum y coordinate of the label area of label 1 with the current y coordinate.

Further, in the third pattern, the conversion information updating unit 233 does not update the conversion information memory 26, and the label updating unit 234 does not update the label memory 24.

In a fourth pattern, the upper pixel is not an effective pixel, i.e., the upper pixel label number ULM is 0, and the left pixel is assigned with label 1. In this case, the assignment unit 231 determines that the target pixel is included in a label area of label 1.

In the fourth pattern, the label area updating unit 232 updates the label area of label 1. Specifically, the label area updating unit 232 updates the maximum x coordinate of the label area of label 1 with the current x coordinate.

Further, in the fourth pattern, the label updating unit 234 writes label number 1 at address x in the label memory 24, and the conversion information updating unit 233 does not update the conversion information memory 26.

In a fifth pattern, the upper pixel is not an effective pixel, and the left pixel is not an effective pixel. That is, the upper pixel label number ULM and the left pixel label number LEFT are both 0. In this case, the assignment unit 231 reads in parallel the values stored at the respective addresses in the currently-used label table memory 27. The assignment unit 231 then sets 1 as the value of the minimum one of addresses storing the value 0, and assigns the corresponding area with the label number represented by the minimum address. For the sake of explanation, it is assumed here that the minimum address represents label number 1.

If there is no unused available label number, the assignment unit 231 may notify the processor 30 that the labeling process is no longer available.

In the fifth pattern, the label area updating unit 232 updates the minimum x coordinate of the label area of label 1 with the current x coordinate, and updates the maximum x coordinate of the label area of label 1 with the current x coordinate. The label area updating unit 232 further updates the minimum y coordinate of the label area of label 1 with the current y coordinate, and updates the maximum y coordinate of the label area of label 1 with the current y coordinate.

Further, in the fifth pattern, the label updating unit 234 writes label number 1 at address x in the label memory 24, and the conversion information updating unit 233 does not update the conversion information memory 26.

Referring back to step S17 in FIG. 10B, the assignment unit 231 substitutes the label number assigned to the target pixel by the process of step S16 in the left pixel label number LEFT. In the example of FIG. 11, the assignment unit 231 substitutes label number 1 in the left pixel label number LEFT.

At step S18, the assignment unit 231 substitutes x+1 in address x. Then, at step S19, the assignment unit 231 determines whether or not address x is 512. If it is determined at step S19 that address x is not 512 (NO at step S19), the procedure returns to step S4. If it is determined at step S19 that address x is 512 (YES at step S19), the assignment unit 231 proceeds to step S20 to substitute 0 in address x, and substitutes y+1 in address y.

At step S21, the assignment unit 231 determines whether or not address y is 256. If it is determined at step S21 that address y is not 256 (NO at step S21), the process of step S22-1 by the assignment unit 231 and the process of step S22-2 by the label updating unit 234 take place.

At step S22-1, the assignment unit 231 updates the currently-used label table memory 27. Specifically, the assignment unit 231 updates the value 0 or 1 stored at each of the addresses in the currently-used label table memory 27 from address 1 indicating the use or non-use of label number 1 to address n indicating the use or non-use of a maximum label number value n (n=15 in the present embodiment). The assignment unit 231 reads a label number from the label area memory 25, and compares the label number with the corresponding address in the currently-used label table memory 27. If the label number matches the address, the assignment unit 231 processes the next address. If the label number does not match the address, the assignment unit 231 rewrites the value stored at the address indicating the use or non-use of the label number to 0, to thereby make the label number reusable as an unused label. That is, when any of the addresses in the label area memory 25 does not match the label number stored at the address, the assignment unit 231 changes the number of the address to be reusable as an unused label number.

The process of step S22-1 allows the label number made unnecessary by the integration to be used in the next processing target line. This configuration reduces the possibility of running out of label numbers and reduces the maximum assignable label number, as compared with a case in which the label numbers are not reusable.

At step S22-2, the label updating unit 234 updates the label memory 24 based on the conversion information stored in the conversion information memory 26. Specifically, the label updating unit 234 updates the first label, i.e., the label number stored at each of the addresses in the label memory 24, from address 0 to address m (m=512 in the present embodiment). The label updating unit 234 inputs the first label, i.e., the label number read from each of the addresses in the label memory 24, to the conversion information memory 26 as the read address of the conversion information memory 26, and acquires and writes the second label, i.e., the label number in the conversion information memory 26, back to the address in the label memory 24.

With the process of step S22-2, therefore, even if the integration of label numbers takes place, the first label, i.e., the label number stored in the label memory 24, is rewritten to the latest label number before the next processing target line is processed.

In the present embodiment, the depth of the label memory 24 is the same as the width of the image to be processed. Alternatively, the label memory 24 may be divided into a plurality of memories such that the respective updating processes of the plurality of memories of the label memory 24 take place in parallel. For example, if the image to be processed has a width of 512 dots, and if the label memory 24 is divided into four memories, the time taken for the updating process is reduced from 512 clocks to 128 clocks. Further, the clocks for the updating process of the label memory 24 are not necessarily required to be the same as pixel clocks, and may preferably be faster than the pixel clocks.

At step S23, the conversion information updating unit 233 initializes the conversion information memory 26.

Figures 12, 13:
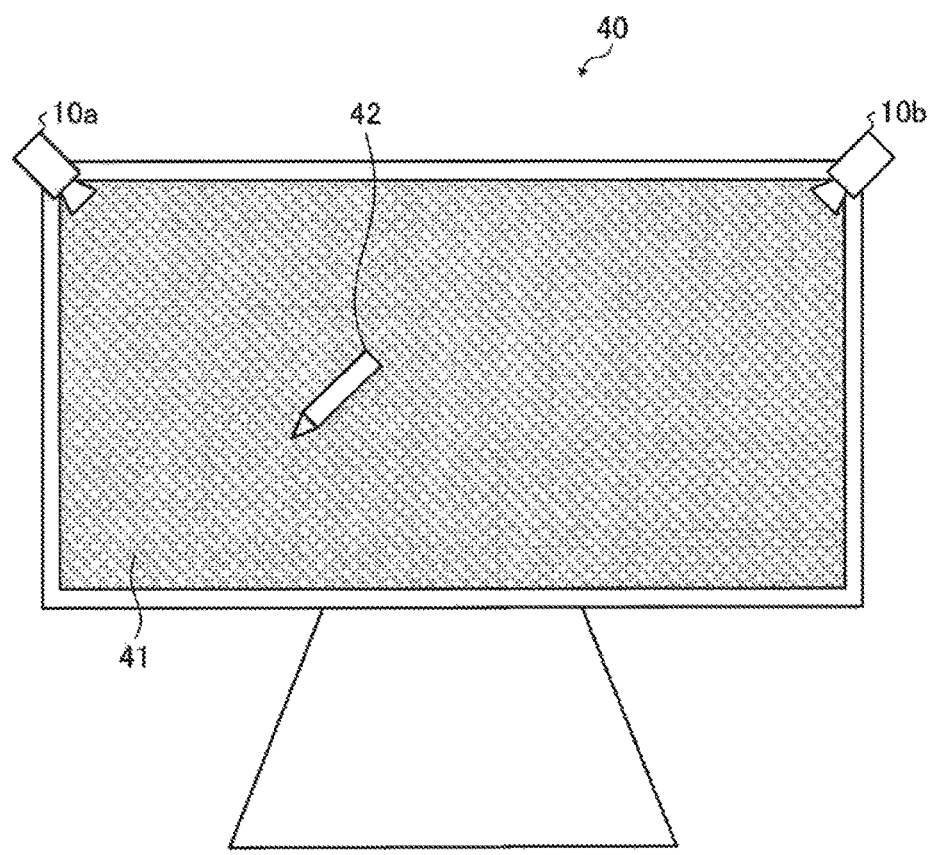
FIG. 12 is a diagram illustrating an example of the conversion information memory according to the embodiment in an initialized state.
FIG. 13 is a diagram illustrating an application example of the image processing device according to the embodiment.

FIG. 12 is a diagram illustrating an example of the conversion information memory 26 according to the embodiment in the initialized state. The conversion information updating unit 233 accesses the plurality of addresses in the conversion information memory 26 in parallel. With a 1-clock updating process, therefore, the conversion information updating unit 233 matches each of the addresses to the label number stored at the address.

Referring back to FIG. 10B, after the completion of the process of step S22-1 by the assignment unit 231 or after the completion of the process of step S23 by the conversion information updating unit 233, the procedure returns to step S3.

If it is determined at step S21 that address y is 256 (YES at step S21), the assignment unit 231 determines that the labeling process on one frame of image has been completed, and proceeds to step S24 to notify the processor 30 of the identification information of the label area. Specifically, the assignment unit 231 refers to the currently-used label table memory 27 to identify valid label numbers, i.e., label numbers assigned at the time of completion of the labeling process on one frame of image. Then, the assignment unit 231 acquires the coordinate information of the valid labels from the label area memory 25, and transmits to the processor 30 the identification information including the label numbers of the valid labels and the coordinate information. Thereby, the processor 30 acquires the identification information of the valid labels with no need to read all contents of the label area memory 25.

After the completion of the labeling process on one frame of image, the assignment unit 231 may notify the processor 30 of the number of the valid labels, i.e., the assigned labels. This configuration allows a subsequent process to be simplified, if the number of valid labels is sufficient as the information for use in the subsequent process.

As described above, according to the image processing device 20 of the embodiment, the labels are assigned to the areas in the image, with the delay time due to the labeling process on each of the processing target lines kept constant irrespective of the data size of the image. That is, the image processing device 20 of the embodiment outputs the result of labeling with a constant delay time in response to the image input, and thus performs the labeling process in real time even at a high frame rate.

Further, according to the image processing device 20 of the embodiment, there is no need to store the data of one frame of image output from the image sensor 10 in an image memory. The image processing device 20 of the embodiment performs the labeling process on each of the processing target lines (i.e., each of the lines) to eventually complete the labeling process on one frame of image. That is, with no need for a memory for storing the entire image or a provisional label memory having a size nearly equal to the size of the image, the image processing device 20 is reduced in cost.

An application example of the image processing device 20 according to the embodiment will now be described.

A typical labeling process requires a label image memory for storing the result of labeling. The label image memory is used to calculate detailed identification information, such as the circumferential length and the degree of circularity of each label area, based on a label image. However, the detailed identification information may be unnecessary, depending on the purpose of the labeling process. For example, it often suffices if the centroid, the maximum brightness value, the area, and the total brightness of the label area and coordinates identifying the rectangle circumscribed about the label area are known. In such a case, a large label image memory or a large image memory typically used in the labeling of the image at a high frame rate causes an increase in cost.

If the image processing device 20 according to the embodiment is applied to an interactive whiteboard (i.e., an electronic blackboard), for example, an increase in speed of the labeling process and a reduction in cost are attained.

FIG. 13 is a diagram illustrating an application example of the image processing device 20 according to the embodiment. FIG. 13 illustrates an example in which the image processing device 20 according to the embodiment is applied to image processing of an interactive whiteboard 40. The image processing device 20 is equipped in the interactive whiteboard 40, for example.

The interactive whiteboard 40 includes image sensors 10a and 10b, a display unit 41, and a light emitting pen 42. Each of the image sensors 10a and 10b captures an image including a light emitting point of the light emitting pen 42. With the foregoing labeling process, the image processing device 20 identifies the light emitting point in the image as a label area. With this configuration, the interactive whiteboard 40 performs processes such as displaying a tip of the light emitting pen 42 on the display unit 41 and determining whether or not an object displayed on the display unit 41 has been selected.

A modified example of the embodiment will now be described.

The reception unit 211 and the labeling unit 230 (i.e., the assignment unit 231, the label area updating unit 232, the conversion information updating unit 233, and the label updating unit 234) of the image processing device 20 according to the foregoing embodiment may partially or entirely be implemented by a program. If the reception unit 211 and the labeling unit 230 are partially or entirely implemented by a program, the image processing device 20 further includes a control device, such as a central processing unit (CPU), for example. Alternatively, for example, the image processing device 20 may be equipped with the processor 30 to cause the processor 30 to execute the program.

The program executed by the image processing device 20 in the modified example of the embodiment is stored in a computer-readable storage medium, such as a compact disc-random access memory (CD-ROM), a memory card, compact disc-recordable (CD-R), or a digital versatile disk (DVD), in an installable format file or in an executable format file, and is provided as a computer program product.

The program executed by the image processing device 20 in the modified example of the embodiment may be stored in a computer connected to a network, such as the Internet, and may be provided as downloaded via the network.

Alternatively, the program executed by the image processing device 20 in the modified example of the embodiment may be provided via a network, such as the Internet, without being downloaded.

Further, the program executed by the image processing device 20 in the modified example of the embodiment may be provided as preinstalled in a ROM, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the above-described steps are not limited to the order disclosed herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing device, comprising:
a label memory to store a first label assigned to a previous-stage pixel included in a previous line subjected to an assignment process of assigning a label to a pixel, prior to the assignment process on a processing target line, the previous line and the processing target line both included in a processing target image to be subjected to the assignment process;
a label area memory to store identification information that identifies a label area that includes pixels assigned with an identical label; and
circuitry configured to,
when a target pixel in the processing target line is determined to be an effective pixel by comparing a value of the target pixel to a threshold, perform the assignment process on the target pixel and assign a label to the target pixel based on at least one label that includes the first label and is assigned to at least one peripheral pixel that is peripheral to the target pixel,
when the target pixel in the processing target line is the effective pixel, convert the first label into a second label with conversion information, and perform the assignment process on the target pixel based on at least one label that includes the second label and is assigned to the at least one peripheral pixel that is peripheral to the target pixel, the conversion information including the first label and the second label associated with the first label, the first label assigned to the previous-stage pixel included in each of the label areas prior to integration, and the second label newly assigned to an integrated label area, and
perform an updating process of updating the identification information based on a position of the target pixel and the label assigned to the target pixel.

2. The image processing device of claim 1, wherein the circuitry is further configured to update the conversion information when a plurality of label areas different from the first label assigned to the previous-stage pixel included in each of the label areas are integrated into the integrated label area by the updating process.

3. The image processing device of claim 2, further comprising a conversion information memory to store the conversion information with the first label representing an address and the second label stored at the address,
wherein the circuitry is further configured to access a plurality of addresses in the conversion information memory, in parallel, to update the second label at the plurality of addresses in parallel.

4. The image processing device of claim 3, wherein when the assignment process of assigning the label to the target pixel in the processing target line is completed, the circuitry is further configured to input the first label at an address in the label memory to the conversion information memory as a read address of the conversion information memory to acquire the second label, and write the acquired second label back to the address in the label memory to update the label memory.

5. The image processing device of claim 4, wherein the label memory includes a plurality of memories, and
wherein the circuitry is further configured to access the plurality of memories, in parallel, to update the label memory.

6. The image processing device of claim 3, wherein when the assignment process of assigning the label to the target pixel in the processing target line is completed, the circuitry is further configured to match the address in the conversion information memory to the second label stored at the address in the conversion information memory to initialize the conversion information memory.

7. The image processing device of claim 1, further comprising a plurality of memory elements each storing 1-bit information of a corresponding label indicating whether the corresponding label is used,
wherein the circuitry is further configured to search through the plurality of memory elements in parallel to acquire any unused label.

8. The image processing device of claim 7, wherein when the assignment process on the processing target image is completed, the circuitry is further configured to search through the plurality of memory elements in parallel to acquire any used label, acquire, from the label area memory, the identification information of the label area identified with the used label, and notify a processor of the identification information acquired from the label area memory.

9. The image processing device of claim 1, wherein the at least one peripheral pixel includes an upper pixel and a left pixel, the upper pixel being located above the target pixel, and the left pixel located to a left of the target pixel,
wherein when the processing target line is at an upper end of the processing target image, a label of the upper pixel is determined to be an invalid label, and
wherein when the target pixel is at a left end of the processing target line, a label of the left pixel is determined to be an invalid label.

10. The image processing device of claim 1, wherein the circuitry is further configured to determine whether the target pixel is the effective pixel by determining whether a brightness value of the target pixel exceeds the threshold.

11. An image processing method, comprising:
storing, in a label memory, a first label assigned to a previous-stage pixel included in a previous line subjected to an assignment process of assigning a label to a pixel prior to the assignment process on a processing target line, the previous line and the processing target line both included in a processing target image to be subjected to the assignment process;
storing, in a label area memory, identification information that identifies a label area that includes pixels assigned with an identical label;
based on a determination that a target pixel in the processing target line is an effective pixel by comparing a value of the target pixel to a threshold, performing the assignment process on the target pixel and assign a label to the target pixel based on at least one label that includes the first label and is assigned to at least one peripheral pixel that is peripheral to the target pixel;
when the target pixel in the processing target line is the effective pixel, converting the first label into a second label with conversion information, and performing the assignment process on the target pixel based on at least one label that includes the second label and is assigned to the at least one peripheral pixel that is peripheral to the target pixel, the conversion information including the first label and the second label associated with the first label, the first label assigned to the previous-stage pixel included in each of the label areas prior to integration, and the second label newly assigned to an integrated label area; and
updating the identification information based on a position of the target pixel and the label assigned to the target pixel.

12. A non-transitory recording medium storing a program for causing a computer to execute an image processing method, comprising:
storing, in a label memory, a first label assigned to a previous-stage pixel included in a previous line subjected to an assignment process of assigning a label to a pixel prior to the assignment process on a processing target line, the previous line and the processing target line both included in a processing target image to be subjected to the assignment process;
storing, in a label area memory, identification information that identifies a label area that includes pixels assigned with an identical label;
based on a determination that a target pixel in the processing target line is an effective pixel by comparing a value of the target pixel to a threshold, performing the assignment process on the at least one target pixel and assign a label to the target pixel based on label that includes the first label and is assigned to at least one peripheral pixel that is peripheral to the target pixel;
when the target pixel in the processing target line is the effective pixel, converting the first label into a second label with conversion information, and performing the assignment process on the target pixel based on at least one label that includes the second label and is assigned to the at least one peripheral pixel that is peripheral to the target pixel, the conversion information including the first label and the second label associated with the first label, the first label assigned to the previous-stage pixel included in each of the label areas prior to integration, and the second label newly assigned to an integrated label area; and
updating the identification information based on a position of the target pixel and the label assigned to the target pixel.

* * * * *